(No Model.)
T. H. WILCOX.
FOLDING BABY CARRIAGE.
No. 535,126. Patented Mar. 5, 1895.
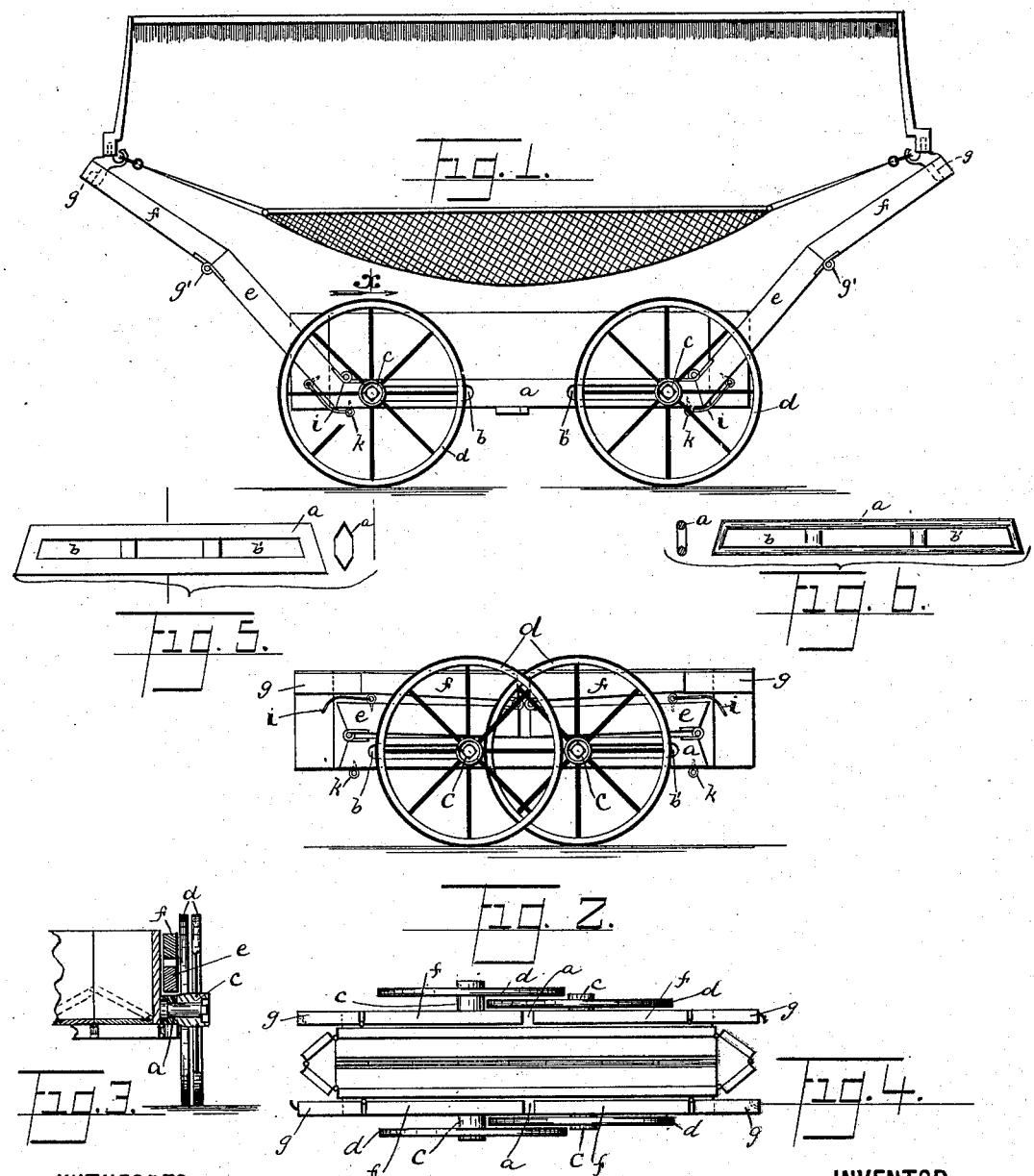
WITNESSES:
Chas. R. Michel
Wm Riley
INVENTOR
Thomas H. Wilcox,
BY Oscar A. Michel & Co, ATT'YS.

UNITED STATES PATENT OFFICE.

THOMAS H. WILCOX, OF BROOKLYN, NEW YORK.

FOLDING BABY-CARRIAGE.

SPECIFICATION forming part of Letters Patent No. 535,126, dated March 5, 1895.

Application filed January 6, 1894. Serial No. 495,995. (No model.)

*To all whom it may concern:*

Be it known that I, THOMAS H. WILCOX, a citizen of the United States, residing at Brooklyn, in the county of Kings and State of New York, have invented certain new and useful Improvements in Folding Baby-Carriages; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to children's carriages which may be folded into a small space for convenience of storage or transportation; and it consists in the hinged frame-work or any form of coupling that will give the desired motion, to which is suspended a hammock or any similar flexible bed. It also can be used as a wagon by removing the uprights and putting a tongue, or any pulling device, into the hooks on the under edge of the side bar, and the wagon body being hinged on the inside of the two side bars and the floor hinged to the bottom edge of the side board of the wagon body and again in the center so that the center will turn up when the same is to be folded, the wagon body being so arranged that when the carriage is being used, the person who is wheeling the same, may be able to put packages in the wagon out of the reach of the baby.

The object of this invention is to construct a baby carriage of simple and cheap character which will be light and durable, also combining a wagon receptacle underneath the flexible body, all of said parts being easily compressed when not in use.

The invention consists in the improved baby carriage and in the combination and arrangement of parts substantially as will be hereinafter set forth and finally embodied in the clauses of the claim.

Referring to the accompanying drawings in which like letters indicate corresponding parts in each of the several figures where they occur, Figure 1 is a side view of my improved baby carriage showing the flexible bed suspended from the front and rear uprights of the carriage. Fig. 2 is a side view of the same when compressed and the front and rear wheels pushed together, so that the front wheels will be between the inner side of the rear wheels and the outer side of the side bars. Fig. 3 is a section on line $x$ of Fig. 1 showing only one-half of the carriage and wagon body, also part of the wheel being in elevation. Fig. 4 is a plan view of the carriage partly folded and looking down and having the flexible bed removed. Figs. 5 and 6 are detail views showing different modifications of the frame work of the carriage.

In said drawings, $a$ represents the side bars of my improved carriage having the slots or spaces $b$ and $b'$ for the reception of the axle or journals $c$ of the wheel $d$. At the ends of the side bars are hinged uprights $e$ on which is hinged the farther upright $f$ to which is hinged the handle or connecting piece $g$ which is hinged in the center so that when the carriage is pressed together it will be seen that the handle or connecting piece will turn outward so that the length of the carriage when compressed will be greatly reduced, also by having the uprights hinged in two parts, as at $g'$ it will fold on top of each other so that the length of the carriage when compressed will be as long as the side bars as fully shown in Fig. 2 of the drawings.

To keep the uprights of the carriage in a stationary or firm position I have employed in this case a hook $i$ fastened on the uprights and on the under edge of the side bars an eye $k$ into which the hook is fastened or any other fastening device may be used.

In the different modifications of the frame work, I show that the same can be made of V-shaped steel or of round wire bent as indicated.

Having thus described my invention, what I claim as new, and desire to secure by Letters Patent of the United States, is—

The combination in a baby carriage of the slotted side bars, the axles having bearings therein, the uprights hinged to the outer ends of the side bars, and the additional uprights hinged to the first mentioned uprights, with the connecting pieces or handles whereby the parts may be operated to fold or unfold the same, substantially as specified.

In testimony that I claim the invention set forth above I have hereunto set my hand this 18th day of December, 1893.

THOMAS H. WILCOX.

Witnesses:
OSCAR A. MICHEL,
S. DE WALLTEARSS.